United States Patent [19]
Smith

[11] 3,988,941
[45] Nov. 2, 1976

[54] DRIVE BELT

[76] Inventor: Thomas R. Smith, 710 W. 11th St. South, Newton, Iowa 50208

[22] Filed: Aug. 1, 1975

[21] Appl. No.: 601,401

[52] U.S. Cl. .......................... 74/231 R; 74/231 C; 74/234
[51] Int. Cl.² ....................... F16G 1/00; F16G 1/28; F16G 5/00
[58] Field of Search ............... 74/231 C, 234, 231 R

[56] References Cited
UNITED STATES PATENTS

| | | | |
|---|---|---|---|
| 2,296,740 | 9/1942 | Reiling | 74/234 |
| 2,865,214 | 12/1958 | Runton | 74/231 C |
| 3,673,883 | 7/1972 | Adams | 74/231 C |

FOREIGN PATENTS OR APPLICATIONS

| | | | |
|---|---|---|---|
| 508,729 | 1/1927 | Germany | 74/234 |

*Primary Examiner*—Leonard H. Gerin

[57] ABSTRACT

A double sided V-belt includes back-to-back V-belt shaped portions with each V-belt portion having recesses extending across the width of the belt and equally spaced along the length of the belt in staggered relationship to each other to form a smooth uniform undulating drive belt having a generally constant vertical cross sectional height.

2 Claims, 4 Drawing Figures

DRIVE BELT

BACKGROUND OF THE INVENTION

1. Field of the Invention

This invention relates to drive belts and more particularly to an undulating double-sided V-belt.

2. Description of the Prior Art

V-belts are commonly used in drive systems for transmitting drive torque from a driving pulley to a driven pulley. Though prior art has disclosed some attempts to obtain a multiple drive system using a single belt with back to back "V" shapes, the result has been a belt that is too stiff or, if notched to increase flexibility, a belt that has had nonuniform flexibility. There thus remains a need for an improved drive belt having uniform flexibility to achieve optimum multiple drive capabilities.

SUMMARY OF THE INVENTION

It is an object of the instant invention to provide an improved double sided drive belt having at the same time great strength and uniform flexibility.

It is a further object of the instant invention to provide a double sided V-belt having transverse undulating recesses spaced along both sides of the belt in staggered relationship to give the belt greater and more uniform flexibility.

The instant invention achieves these objects in a drive belt construction comprising a resilient body formed as a pair of back-to-back V-belt shaped portions each having an undulating surface defining recesses extending across the V-belt portion and spaced along the length of the belt in staggered relationship and with longitudinal reinforcing elements along a narrow band at generally the midsection.

Specific construction of the improved double sided V-belt and further objects and advantages thereof will become evident as the description proceeds and from an examination of the accompanying sheet of drawings.

BRIEF DESCRIPTION OF THE DRAWINGS

The drawings illustrate a preferred embodiment of the invention with similar numerals referring to similar parts through the several views wherein.

DESCRIPTION OF A PREFERRED EMBODIMENT

Figure 1:
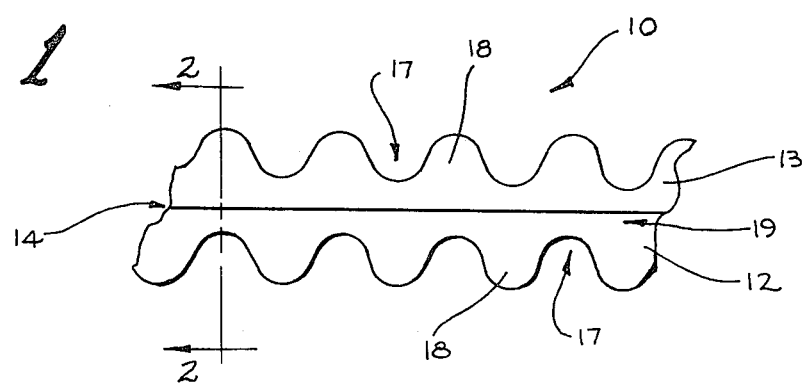
FIG. 1 is a side view of a fragmentary length of double-sided V-belt embodying the instant invention.
Figure 2:
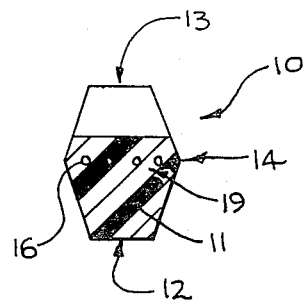
FIG. 2 is a section view of the drive belt of the instant invention as taken along line 2—2 of FIG. 1.

Referring to FIGS. 1 and 2, there is shown a side view of a relatively short fragmentary length of double-sided V-belt 10. The fragmentary length is part of an elongated endless loop for use as a drive belt and comprises a resilient body 11 formed of an elastomeric material.

The body 11 includes a first portion 12 having, as in FIG. 2, a generally V-shaped cross section and a second portion 13 having an inverted V-shaped cross section. The two V-shaped portions 12 and 13 are joined back-to-back along a central plane of midline 14. A plurality of strands of reinforcing material 16 are disposed at generally the midline 14 to limit elongation of the resilient body 11 and give tensile strength to the belt.

The resilient body 11 includes a pair of parallel undulating surfaces defining spaced recesses 17, as in FIG. 1, extending across each V-belt portion 12 and 13, as indicated in FIG. 2, and extending inwardly toward the midline 14, as best shown in FIG. 2. In the embodiment of FIGS. 1 and 2 the recesses 17 and belt portions 18 therebetween define an undulating or sinuous belt. The recesses 17 do not extend the full depth of V-belt portion to the midline 14 thus leaving an endless central strip or core 19 at the midline 14.

The recesses 17 spaced along the length of the belt 10 effectively remove only a portion of the driving surfaces of the V-belt but provide relief for proper bending of the belt 10 in either direction relative to the midline 14 so that either or both of the V-belt portions 12 and 13 may be used for engagement with driving or driven pulleys. The recesses 17 permit greater and more uniform flexure of the belt 10 as it passes over a mating pulley since the recesses are uniformly spaced apart and staggered relative to the recesses 17 of the other V-belt portion. The desired flexure is thus achieved while retaining greater uniformity of cross section in the body 11.

The staggered uniformly spaced recesses 17 define a double sided V-belt 10 in which the outer most undulating surfaces are uniformly spaced apart. The vertical distance of a transverse section of belt 10 thus is substantially constant along the length of the belt. The construction insures a more uniform stressing of the belt 10 during multiple drive use. With stress concentrations thus obviated, the life of the belt 10 is improved.

Figure 3:
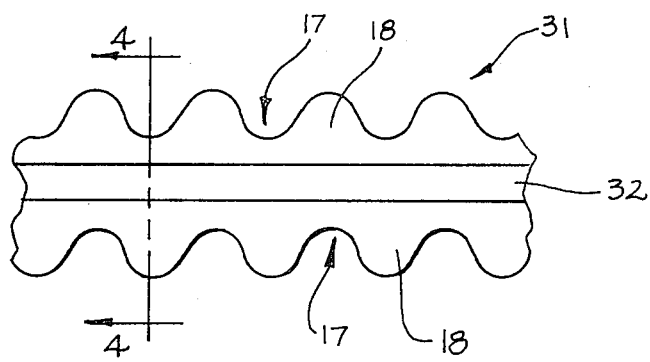
FIG. 3 is a side view of a fragmentary portion of a drive belt comprising an alternate embodiment of the instant invention.
Figure 4:
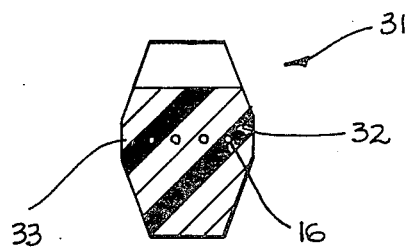
FIG. 4 is a section view of a drive belt of FIG. 3 as taken along line 4—4 of FIG. 3.

An alternate cross section for a double sided V-belt 31 is shown in FIGS. 3 and 4. The belt 31 may have recesses 17 and belt portions 18 therebetween of the type shown in FIGS. 1 or 2 but includes an expanded or heavier central strip or core 32 at the midline. FIG. 4 also shows that the sides 33 of the belt 31 at the central core 32 may be formed with a flat.

It is thus clear that the drive belt of the instant invention may be used in a drive system having a plurality of pulleys engaging the improved belt on either of both sides and still achieve proper flexure and strength of the belt and proper driving engagement between the pulley and either side of the drive belt.

In the foregoing drawings and specification, there has been set forth a preferred embodiment of the invention and although specific terms are employed, these are used in a generic and descriptive sense only and not for purposes of limitation. Changes in form and the proportion of parts are contemplated as circumstances may suggest or render expedient without departing from the spirit or scope of this invention.

I claim:

1. A drive belt construction comprising an endless elongated resilient member having a pair of generally back-to-back V-belt shaped portions on opposite sides of a longitudinally extending midline forming a double sided V-belt, said elongated member including opposite undulating surfaces defining a plurality of recesses extending transversely across each V-belt shaped portion spaced along the length of said elongated resilient member with recesses in one V-belt shaped portion being staggered and effectively disposed symmetrically inbetween the recesses in the other V-belt shaped portion, said recesses and the remaining V-belt shaped portions therebetween defining a uniform sinuous belt body whereby the height of a transverse section normal to said midline remains substantially constant, and longitudinally extending reinforcing means disposed at generally said midline to provide longitudinal strength and dimensional stability.

2. A drive belt as defined in claim 1 wherein said back-to-back V-belt shaped portions are spaced apart by a longitudinally extending core.

* * * * *